Patented Jan. 8, 1952

2,581,354

UNITED STATES PATENT OFFICE 2,581,354

STABILIZATION OF ADIPONITRILE

Charles A. Bordner, Niagara Falls, N. Y., assignor to E. I. du Pont de Nemours and Company, Wilmington, Del., a corporation of Delaware No Drawing. Application December 6, 1950, Serial No. 199,583

9 Claims. (Cl. 260—465.8)

This invention relates to a method of improving the heat stability of adiponitrile and to adiponitrile compositions having improved heat stability.

One commercial method for producing adiponitrile involves reacting an alkali metal cyanide with 1,4-dichlorobutane. The reaction is usually carried out in a mutual solvent for the reactants. When the reaction is complete the salt formed, usually sodium chloride, is filtered off leaving solvent, dichlorobutane, chlorovaleronitrile, adiponitrile and various by-products some of which have not been identified. The reaction mixture is then subjected to a series of treatments including distillation, the purpose of which is to recover the adiponitrile in sufficient purity for use as a nylon intermediate.

One of the major difficulties experienced in carrying out the operations indicated above is the fact that under the conditions normally existing during distillation of adiponitrile, it tends to decompose with the formation of compounds which are characterized by their ability to be oxidized by potassium permanganate under the conditions indicated below. These compounds cannot be effectively separated from adiponitrile by distillation procedures but can be removed by decomposition with potassium permanganate. However this method for their removal is expensive and unsatisfactory. It is essential that these permanganate oxidizable impurities which tend to be formed be kept to a minimum as it has been found that their presence causes serious trouble in the subsequent processing of adiponitrile as a nylon intermediate. In the process as heretofore operated these impurities continued to build-up in the distillation system to the point where the recycling of various fractions containing adiponitrile for further purification became impractical.

Various methods for preventing the build-up of objectionable permanganate oxidizable impurities during distillation treatments of adiponitrile and fractions containing this material have been attempted with little or no practical success. It has been found that the presence of small amounts of adipic acid, sebacic acid, or phosphoric acid in adiponitrile which is to be subjected to distillation treatment, exert some beneficial effect, but their use is far from satisfactory in commercial operations.

The problem of adiponitrile decomposing to form permanganate oxidizable impurities occurs whenever adiponitrile, whether in purified or crude form, is subjected to heating at elevated temperatures. This tendency toward decomposition increases as the temperature of heating is increased and becomes especially noticeable and bothersome at temperatures of around 140° C. and higher, e. g., temperatures such as 150 to 225° C. which are normally employed in vacuum distillation treatments. Decomposition of this type is most noticeable when the adiponitrile is heated in contact with metals such as iron and steel which are commonly employed in commercial processing equipment. However, decomposition also occurs in glass equipment so that whenever adiponitrile is heated to elevated temperatures the problem of preventing decomposition will exist.

One object of the invention is to provide a method for increasing the heat stability of adiponitrile. Another object is to provide adiponitrile having improved heat stability. Another specific object is to provide a method whereby adiponitrile may be subjected to distillation and similar heat treatments without excessive formation of permanganate oxidizable impurities. A still further object is to provide an improved method of purifying adiponitrile. These and still other objects will be apparent from the following description.

The above objects are accomplished in accordance with the invention by adding ammonium dihydrogen phosphate to adiponitrile and by effecting heat treatments of adiponitrile, such as distillation treatments, in the presence of ammonium dihydrogen phosphate.

Various concentrations of ammonium dihydrogen phosphate may be utilized in practicing the invention. Usually it will be added to the adiponitrile, or composition containing adiponitrile, in minor amounts. Ordinarily, amounts within the range 0.005% to 5% based on the weight of adiponitrile present will be used, the preferred amounts being of the order of 0.01 to 0.1%. Amounts below about 0.005% are generally insufficient to exert any substantial stabilizing action while amounts above about 5%, although useable, generally serve no useful purpose.

The invention is based upon the discovery that ammonium dihydrogen phosphate exerts a remarkable and unexpected stabilizing effect against the decomposition of adiponitrile when heated to produce impurities which are oxidizable by potassium permanganate. This beneficial stabilizing action is effective whenever adiponitrile, whether purified or crude, is subjected to elevated conditions of temperature. Accordingly, this ammonium dihydrogen phosphate can be advantageously added in amounts of the order indicated above to any adiponitrile which is to be heated. Thus it may be added to adiponitrile which is to be purified by distillation, e. g., under reduced pressure, or to adiponitrile which is to be heated for the purpose of stripping off impurities which are more volatile than adiponitrile.

The amount of permanganate oxidizable impurities in adiponitrile is determined in the following manner. Ten cc. of the material to be tested is transferred to a 250 cc. flask. Ten cc. of a 10% solution of sulfuric acid is added and the flask is mounted on a shaker device and immersed in a constant temperature bath maintained at 25° C. A 1% aqueous solution of potassium permanganate containing 1% of sulfuric acid is then added dropwise from a microburette until a faint pink color persists after 5 minutes of shaking. The permanganate value of the sample is the weight percent of KMnO4 required, calculated by the following equation:

$$\frac{\text{cc. KMnO}_4 \text{ solution}}{\text{cc. of sample}} = \%\text{KMnO}_4$$

In the usual treatments for isolating and purifying adiponitrile prepared by the method indicated above, there are obtained various intermediate impure fractions of adiponitrile. It has been found that such intermediate fractions can be successfully recycled in the purification cycle for the purpose of recovering the adiponitrile and other values thereof provided the permanganate values of such intermediates is not greater than about 0.10. The following examples illustrate the use and value of the present invention in treating such an intermediate fraction to recover adiponitrile of a quality which permits successful recycling.

*Example 1—(No ammonium dihydrogen phosphate present)*

A sample of crude adiponitrile, from which the lower-boiling components (solvent, chlorovaleronitrile, dichlorobutane) had been removed, was distilled at 25 millimeters head pressure through a Pyrex glass still measuring 1½" in diameter and 36" long. This column was packed with ¼" porcelain saddles. Steel strips having a total surface area of 86 square inches were added to the still pot to simulate the effect of metal present in industrial distillation equipment. The reflux ratio in the still was controlled by an electrical timer actuating a pivoted funnel in the still head.

During a period of 18 hours, a total of 374 grams of material were distilled at 10:1 reflux ratio from a charge of 2000 grams. This means that 18.7% of the charge had been distilled, leaving a maximum of 1626 g. or 81.3% of adiponitrile. However, at this point the material remaining in the still pot was not satisfactory for further processing to refined adiponitrile. The permanganate value was 0.122.

*Example 2—(Ammonium dihydrogen phosphate present)*

This distillation was carried out in the same equipment as Example 1 and under the same conditions, using crude adiponitrile of the same stock supply. To 2000 g. of the crude adiponitrile there was added 2 g. of dihydrogen ammonium phosphate. In 14.8 hours of distillation, 266 g. of material had been distilled (13.3%), leaving 1734 g. or 86.7% of purified adiponitrile having a permanganate value of 0.080. Thus, the distillation time was decreased by 17.8%, the yield was increased 6.7%, and the resulting material was suitable for further refining.

The presence of ammonium dihydrogen phosphate is also effective in distillations similar to those illustrated in the examples except that the adiponitrile is recovered as an overhead fraction instead of as the distillation residue. It is also effective in any process in which adiponitrile is heated to elevated temperatures.

In distillations of the type illustrated in the above examples, the object is to carry out the distillation only so long as is necessary to reduce the permanganate oxidizable impurities to a value low enough to permit successful recycling of the residual adiponitrile for further processing. The fact that the presence of small amounts of ammonium acid phosphate permits the accomplishment of this object in a substantially shorter time, and with a greater yield of purified product without undesired build-up of permanganate oxidizable impurities, as demonstrated in the above examples, is obviously highly advantageous.

I claim:

1. The method for inhibiting the formation of potassium permanganate oxidizable impurities in adiponitrile when the latter is heated comprising heating said adiponitrile in the presence of a minor amount of ammonium dihydrogen phosphate.

2. The method of distilling adiponitrile under conditions which inhibit formation of potassium permanganate oxidizable impurities comprising distilling said adiponitrile n the presence of a minor amount of ammonium dihydrogen phosphate.

3. The method for removing from adiponitrile impurities which are less volatile than said adiponitrile comprising distilling adiponitrile containing said impurities in the presence of a minor amount of ammonium dihydrogen phosphate under distillation conditions whereby said impurities are removed as overhead products and the purified adiponitrile is recovered as the distillation residue.

4. The method of claim 1 in which 0.005 to 5% of ammonium dihydrogen phosphate based on the weight of the adiponitrile present is used.

5. The method of claim 2 wherein 0.005 to 5% ammonium dihydrogen phosphate based on the weight of adiponitrile present is used.

6. The method of claim 3 wherein 0.005 to 5% by weight ammonium dihydrogen phosphate based on the weight of adiponitrile present is used.

7. A composition of improved heat stability comprising adiponitrile and a minor amount of ammonium dihydrogen phosphate.

8. A composition of improved heat stability comprising adiponitrile and 0.005 to 5% ammonium dihydrogen phosphate based on the weight of adiponitrile present.

9. A composition of improved heat stability comprising adiponitrile and 0.01 to 0.1% ammonium dihydrogen phosphate based on the weight of adiponitrile present.

CHARLES A. BORDNER.

No references cited.